US009268367B2

(12) United States Patent
Aguera y Arcas et al.

(10) Patent No.: US 9,268,367 B2
(45) Date of Patent: Feb. 23, 2016

(54) USE OF LOW-POWER DISPLAY ON DEVICE

(75) Inventors: Blaise H. Aguera y Arcas, Seattle, WA (US); Scott V. Fynn, Seattle, WA (US); Donald Barnett, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1002 days.

(21) Appl. No.: 12/904,127

(22) Filed: Oct. 13, 2010

(65) Prior Publication Data
US 2012/0096373 A1 Apr. 19, 2012

(51) Int. Cl.
G09G 5/12 (2006.01)
G06F 1/32 (2006.01)
G06F 1/16 (2006.01)

(52) U.S. Cl.
CPC ............ G06F 1/1645 (2013.01); G06F 1/3265 (2013.01); G06F 1/3287 (2013.01); Y02B 60/1242 (2013.01); Y02B 60/1282 (2013.01); Y02B 60/32 (2013.01)

(58) Field of Classification Search
USPC ......... 455/145, 457, 566; 345/1.1–6, 10–111, 345/156–184
See application file for complete search history.

(56) References Cited

U.S. PATENT DOCUMENTS

| | | | |
|---|---|---|---|
| 6,297,945 B1 | 10/2001 | Yamamoto | |
| 6,466,292 B1 | 10/2002 | Kim | |
| 7,142,195 B2 | 11/2006 | Northway et al. | |
| 7,221,331 B2 | 5/2007 | Bear et al. | |
| 7,355,338 B2 | 4/2008 | Osame et al. | |
| 7,430,739 B2 | 9/2008 | Vellanki et al. | |
| 7,502,221 B2 | 3/2009 | Fuller et al. | |
| 7,511,682 B2 | 3/2009 | Fuller et al. | |
| 7,549,154 B2 | 6/2009 | Rhoten et al. | |

(Continued)

FOREIGN PATENT DOCUMENTS

| | | |
|---|---|---|
| CN | 1964366 A | 5/2007 |
| CN | 101021766 A | 8/2007 |
| WO | 2010111192 A2 | 9/2010 |

OTHER PUBLICATIONS

"International Search Report and Written Opinion of the International Searching Authority", Mailed Date: May 31, 2012, Application No. PCT/US2011/051142, Filed Date: Sep. 11, 2011, 9 pages.

(Continued)

Primary Examiner — Vladimir Magloire
Assistant Examiner — Erica Navar
(74) Attorney, Agent, or Firm — Steven Spellman; Tom Wong; Micky Minhas

(57) ABSTRACT

A device may have a plurality of displays, such as a high-power display and a low-power display. The low-power display may be used to display various types of information. Some examples of information that may be displayed on the low-power display include personal customizations of the device (e.g., skins, tattoos, text or graphics, etc.), a battery meter, a signal strength meter, the date and time, or any other type of information. In one example, the device has a separate processor that drives the low-power display, so that the low-power display can be used while the device is in sleep mode or off. In another example, an application that runs on the device's regular processor uses the high- and low-power displays cooperatively to display output from an application. The low-power display can be wrapped around the edges and/or corners of the device, to make effective use of the device's surface area.

20 Claims, 6 Drawing Sheets

(56) References Cited

U.S. PATENT DOCUMENTS

| | | | |
|---|---|---|---|
| 7,558,884 | B2 | 7/2009 | Fuller et al. |
| 7,577,771 | B2 | 8/2009 | Steeb et al. |
| 7,631,267 | B2 | 12/2009 | Viji et al. |
| 7,634,780 | B2 | 12/2009 | Rhoten et al. |
| 7,660,914 | B2 | 2/2010 | Perez et al. |
| 7,711,868 | B2 | 5/2010 | Rhoten et al. |
| 2002/0118201 | A1* | 8/2002 | Mukherjee et al. ............ 345/504 |
| 2005/0157195 | A1 | 7/2005 | Ohashi et al. |
| 2006/0194619 | A1 | 8/2006 | Wilcox et al. |
| 2006/0232494 | A1 | 10/2006 | Lund et al. |
| 2006/0238439 | A1 | 10/2006 | Fuller et al. |
| 2006/0284787 | A1 | 12/2006 | Bear et al. |
| 2007/0103434 | A1 | 5/2007 | Lian et al. |
| 2007/0195007 | A1 | 8/2007 | Bear et al. |
| 2007/0226734 | A1 | 9/2007 | Lin et al. |
| 2007/0242061 | A1 | 10/2007 | Rhoten et al. |
| 2007/0268200 | A1 | 11/2007 | Fuller et al. |
| 2008/0068292 | A1 | 3/2008 | Yuan et al. |
| 2008/0153452 | A1* | 6/2008 | Huang et al. .................. 455/403 |
| 2009/0082066 | A1* | 3/2009 | Katz ............................. 455/566 |
| 2010/0048253 | A1* | 2/2010 | Park et al. ..................... 455/566 |
| 2010/0156913 | A1 | 6/2010 | Ortega et al. |
| 2010/0240402 | A1* | 9/2010 | Wickman et al. ............. 455/466 |
| 2010/0299626 | A1 | 11/2010 | Hegde et al. |
| 2010/0331054 | A1* | 12/2010 | Roberts et al. ................ 455/567 |
| 2012/0050975 | A1 | 3/2012 | Garelli et al. |

OTHER PUBLICATIONS

Arm, "WND Wind Duo 2200! Dual Sim-Dual Face Handset", Retrieved at <<http://www.mobilephones-news.com/2010/03/wnd-wind-duo-2200-dual-sim-dual-face-handset/ >>, dated Mar. 24, 2010 (but article describes a handset that appear to have existed more than one year prior to the article's publication date), 10 pages.

Haselton, Todd, "Apple iPhone 4 announced, features Retina display and 720p HD video recording", Retrieved at <<http://www.mobileburn.com/review.jsp?Id=9654 >>, Jun. 7, 2010, 4 pages.

Hinckley, et al., "Codex: A Dual Screen Tablet Computer", Retrieved at <<http://research.microsoft.com/en-us/um/people/kenh/codex-chi-2009-with-authors.pdf >>, Proceedings of the 27th international conference on Human factors in computing systems, Apr. 4-9, 2009, 10 pages.

"What Apple Tablet? Here Is the Microsoft Courier Dual-screen Booklet", Retrieved at <<http://www.softsailor.com/news/8047-what-apple-tablet-here-is-the-microsoft-courier-dual-screen-booklet.html >>, Sep. 23, 2009, 4 pages.

"Nokia 6131Key Features", Retrieved at <<http://www.mobilesprofiles.com/tag/mobile-prices-1747 >>, Nov. 20, 2007, 5 pages.

Naik, Prasad, "Acer DX650: Dual-sided Mobile Phone", Retrieved at <<http://www.techtree.com/techtree/jsp/article.jsp?print=1&article_id=104810&cat_id=614 >>, Jul. 27, 2009, 11 pages.

Search Report from Chinese Patent Application No. 201110309676.5, dated Aug. 20, 2013, 1 page.

"Difference between Windows Desktop Gadgets and SideShow Gadgets", Retrieved at <<http://www.thewindowsclub.com/difference-between-windows-desktop-gadgets-and-sideshow-gadgets>>, May 19, 2014, 3 pages.

"Introduction to the Windows SideShow Platform", <<Retrieved at http://msdn.microsoft.com/en-us/library/windows/hardware/ff547808(v=vs.85).aspx>>, May 19, 2014, 3 pages.

Ziegler, Chris, "Exclusive: Samsung Continuum for Verizon has double the displays, double the fun", Sep. 30, 2010, retrieved from http://www.engadget.com/2010/09/30/exclusive-samsung-continuum-for-verizon-has-double-the-displays/.

* cited by examiner

USE OF LOW-POWER DISPLAY ON DEVICE

BACKGROUND

Mobile phones, and other small computing devices, are being built with increasingly large display surfaces. While the devices themselves, in general, are smaller than they were several years ago, modern devices devote a relatively larger percentage of the device's surface to the display. Early devices typically had a mechanical keypad for input and a screen to display output. Since the keypad and screen coexisted on the same side of the device, there was a limit as to how large the display could be. While some phones continue to use mechanical keypads (which are favored by some users), advances in touch-screen technology have allowed other devices to omit the keypad entirely in favor of a touch-screen interface that acts as both an input device and a display. This design allows a larger portion of the surface area to be used as a display.

Some devices include more than one display area. For example, some phones with a "flip" or "slide out" design include plural displays—e.g., one large display as the main viewing area, and another smaller display to show a clock, a "message waiting" indicator, etc. In some cases, one of the displays may use less power per viewing area than the other display—e.g., one display may be color and the other may be monochrome (where a monochrome display generally uses less power than a color display).

Despite these designs, phones and other devices generally include less display real estate than they could. There is often a considerable amount of surface area on the device that could accommodate a display, but that is not being used as a display.

SUMMARY

One or more low-power displays, such as electronic ink (e-ink) displays, can be fitted to a mobile phone or other device, and certain types of information can be displayed on these low-power displays. The use of a low-power display in this manner frees real estate on the device's other displays, and provides opportunities to show information that otherwise would not be shown. The use of a low-power display on a device to supplement an ordinary high-power display may reduce the power load on the device (e.g., if some information can be displayed on the low power display when the high-power display is off). Moreover, the combined use of low- and high-power displays in clever ways can provide a compelling user experience.

Although the subject matter herein is not limited to any particular type of low-power display, some example features of low power displays may include a relatively low refresh rate, and the ability to hold an image indefinitely without the application of power. Thus, low-power displays could be used to display content that changes infrequently—e.g., user-specific "skins" or "tattoos", or moving images that involve relatively slow animation such as a moving diagram of objects in the night sky.

A low-power display could be driven by its own processor. The processor that drives the low-power display could be a relatively low-power processor. In this way, a device could be put in sleep mode to turn off the main processor and the main display, while also allowing the device to perform some computation, and to display the results of that computation, even while the device is in sleep mode. For example, such a configuration could be used to display (and update) the date and time on a device that is otherwise in sleep mode. However, the low-power display could also display content generated by the main processor. Thus, a program could use both the high- and low-power displays to display different aspects of the program's output.

In one example, a low-power display (such as an e-ink display) can be molded to the contours of a device's surface, thereby allowing the e-ink display to be wrapped around the corners or edges of a device. In this way, portions of a device's surface, which would otherwise go unused, could be used as a display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
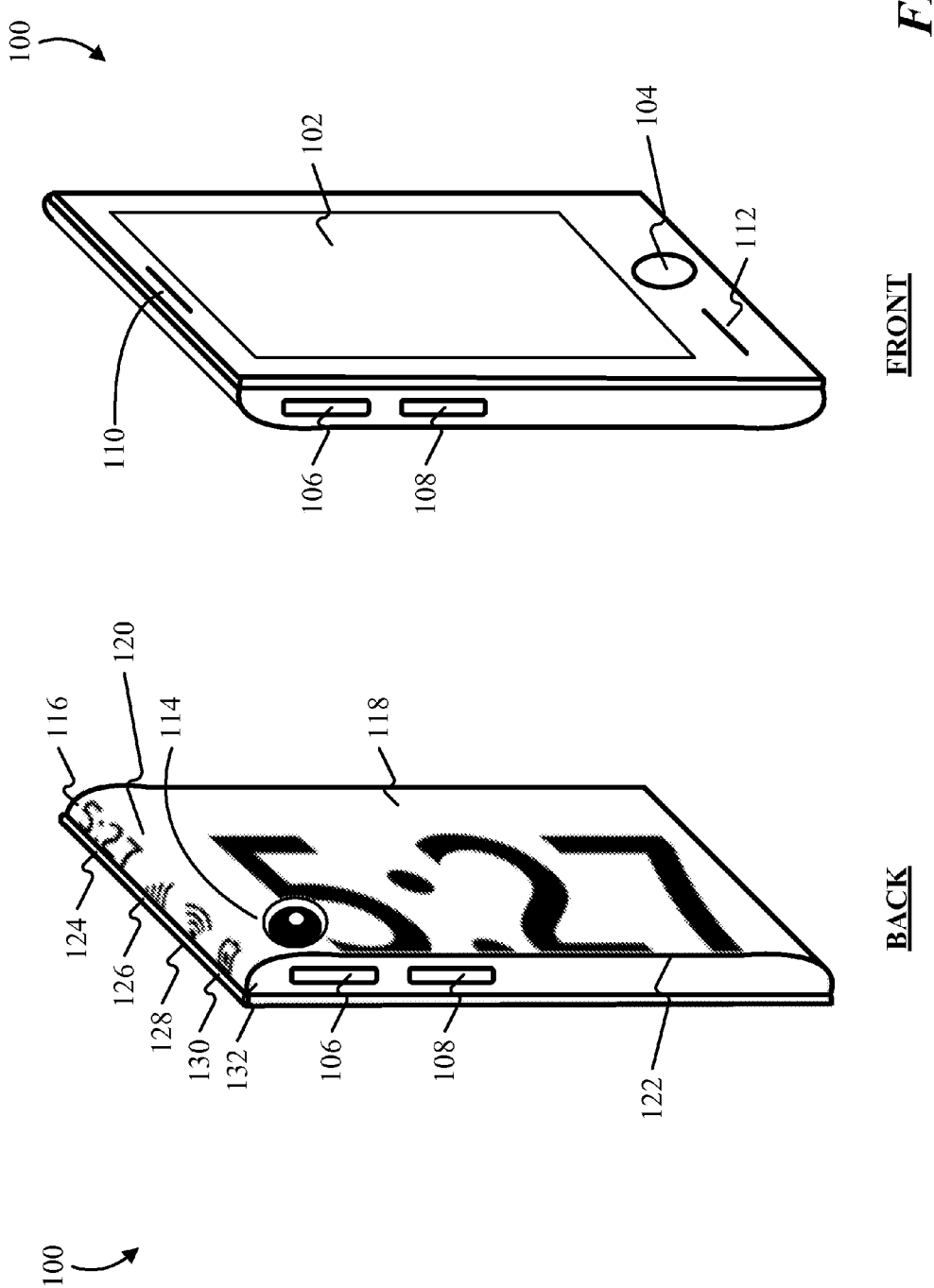
FIG. 1 is two perspective views of an example device that employs a low-power display.

As technology advances, mobile phones and other devices are being designed such that a display occupies an increasing proportion of the device's surface area. It was once common for a device to have a single display that took up, perhaps, one half the surface of one side of the device. Now, some devices have a display that occupies almost the entire surface of one side of the device, and some of these devices have more than one display. For example, some mobile phones or tablet computers have a touch screen that takes up a large proportion of a single side of the device, and that functions as the device's main input and output device. Some devices, such as "flip" or "slide out" phones (or even devices with no "flip" or "slide out" feature) have plural displays.

When devices have plural displays, the displays are typically used in different ways. For example, a flip phone may have a large display that acts as the main display for the phone, and a small auxiliary display on the outside of the phone that displays the date, time, strength of radio reception, new message notifications, etc. In some cases, the displays are of different types—e.g., the main display may be a color touch screen, while the auxiliary display may be a simple monochrome display. However, one aspect of these displays is that they generally draw a substantial amount of power, and thus the amount of time that they spend displaying information has to be carefully managed. Thus, on a typical device, each of the displays is on a timer that turns off the display after some number of seconds of inactivity, or that turns off the display based on some other type of trigger. For this reason, displays typically are not used to display certain types of information. For example, a user might want to adorn the surface of his device with a custom skin, a custom animation, the user's name, etc. However, since displays that draw significant amounts of power generally turn off after a few seconds of inactivity, such displays generally are not used to display this type customization information.

The subject matter herein makes use of low-power displays to display various types of information. A phone or other type of device may be created with a low-power display on its surface. Such a device typically has more than one display, and the low-power display is "low-power" in the sense that it displays a given piece of information using a lower level of power than another display on the device would use to display that information. In one example, the low-power display is an electronic ink (e-ink) display, which is able to display an image even after power has ceased to be applied to the display. However, other types of low-power displays could be used.

The low-power display may be used to display various types of information. For example, the user could choose a particular image, and that image could be displayed continuously on the low-power display. Or, the user could choose to have the date, the time, the temperature, or any other type of information displayed on the low-power display. In one example, the information to be displayed is animated (e.g., an animation of the motion of objects in the night sky). Such an animation could be effectuated by a low-power processor that drives the low-power display, even when the device to which the display is attached is currently in sleep mode.

Some low-power displays can be contoured. In one example the surface of the device has some type of non-flat contour. Examples of non-flat contours include: edges (smooth or rounded); corners (smooth or rounded); or surfaces that are non-planar. Certain types of low-powered displays (e.g., e-ink displays) can be molded to fit on a non-flat surface, thereby allowing such non-flat surfaces on a device to be used as display real estate. In one example, a low-power display is wrapped around the edges and/or corners of the device, and is used to display basic information such as the date and/or time, strength of signal reception, etc. However, a contoured display could be placed on any part of a device, and could be used to display any type of information.

Turning now to the drawings, FIG. 1 shows perspective views of an example device 100 that interacts with a user, and that uses a low-power display. In the example shown, device 100 is depicted as a mobile phone. However, device 100 could be any other type of device—e.g., a laptop computer, a "netbook", a tablet computer, a music player, or any other type of device.

Device 100 may have a touch screen 102, various buttons 104, 106, and 108, a speaker 110, a microphone 112, a lens 114, and one or more low-power displays 116 and 118. Touch screen 102 may be a color display that is used as both an input and output device. For example, touch screen 102 may display output generated by programs that execute on device 100, and may also receive input from a user in the form of gestures, handwriting, an on-screen keyboard, etc.

Buttons 104, 106, and 108 may be used as additional input devices. For example, buttons 106 and 108 may control aspects of device 100 such as audio volume, visual brightness, or other aspects of device 100. Button 104 may be used as an "escape" button that exits whatever program is running on device 100, and returns the user to a desktop or selection screen that allows a user to choose an application. The foregoing are some example uses of buttons 104-108, although buttons 104-108 could be used to communicate any type of input to device 100, or could be used in any other manner.

Speaker 110 and microphone 112 may be used for audio output and/or input. In the example in which device 100 is a phone, speaker 110 and microphone 112 may be used to allow a user to carry on a conversation, although speaker 110 and microphone 112 could be used for other audio applications.

Lens 114 may be used to capture visual input. For example, device 100 may have a photo-taking application that uses lens 114 to capture images, and that stores and/or transmits the images that have been captured through lens 114. As another example, device 100 may have a video application that uses lens 114 to capture moving images.

Device 100 may also have one or more low-power displays 116 and 118. Low-power displays may be "low power" in the sense that they use less power to display a given piece of information than other types of displays. Thus, touch screen 102 may use one level of power, and low-power display 116 or 118 may use another level of power. Thus, in this example, displays 116 and 118 are "low-power" in the sense that the level of power that they use to display some information is lower than the level of power that touch screen 102 uses to display that information. In one example, low-power displays 116 and 118 are e-ink displays, although low-power displays could be implemented using any type of display technology.

Device 100 may have a non-flat contour, in the sense that the surface of device 100 has an edge, a corner, or some other non-planar surface. An edge may be rounded or sharp. FIG. 1 shows both rounded edges (e.g., edge 120), and sharp edges (e.g., edge 122). Low-power displays may be fitted to whatever kind of contour the surface of device 100 has. For example, low-power display 116 wraps around the edge of device 100. Low-power display 116 is shown as being wrapped around a rounded edge, although a low-power display could also be around a sharp edge. Likewise, a low-power display could be wrapped around a (sharp or rounded) corner (such as corner 132).

Any type of information could be displayed on a low-power display. However, one feature of a low-power display is that it can display information without drawing much power (or, in the case of some display technologies, without drawing any power). In some cases, information can be displayed on a device even when the device is in sleep mode, or even when it is off or out of power. Thus, the type of information that is displayed may be information that is to be displayed all the time (or that is to be displayed for a long time). In the example of FIG. 1, low-power display 116 displays the time 124, radio signal strength 126, WiFi signal strength 128, and battery meter 130. This information may be the kind of information that a user would want to see, even if the main display of the device (e.g., touch screen 102) is off.

Figure 2:
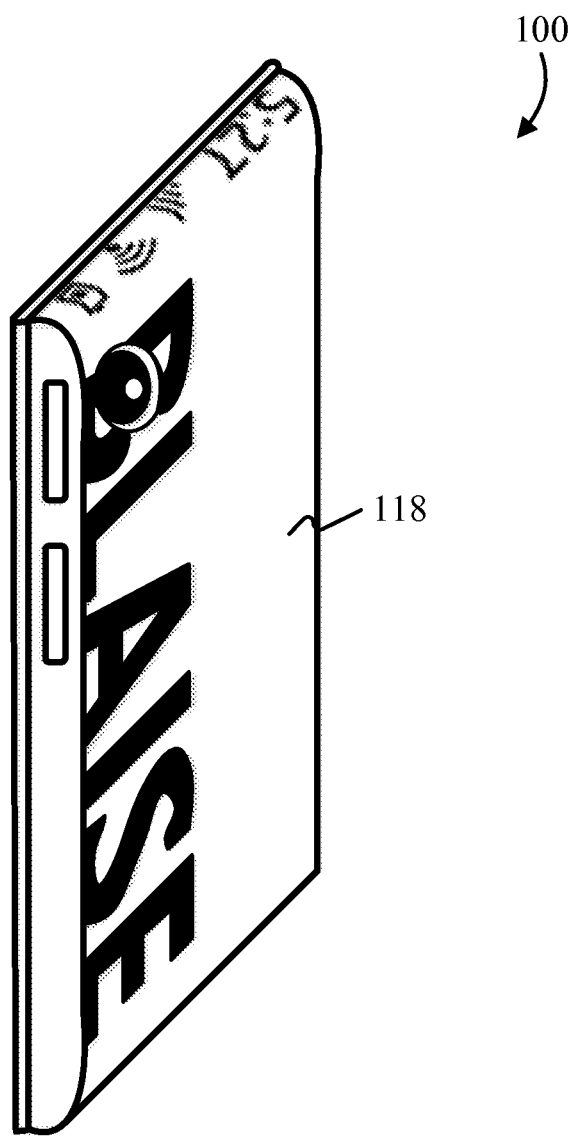
FIGS. 2 and 3 are perspective views of the example device of FIG. 1, with various example kinds of user-specific information.
Figure 3:
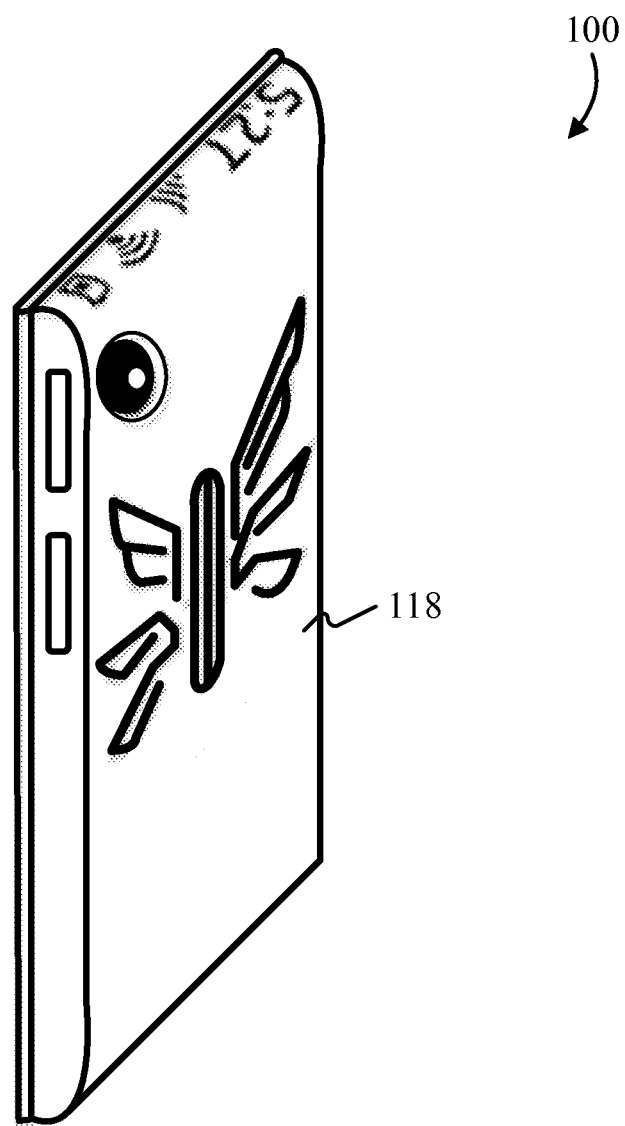

Additionally, low-power display 118 can show various types of information. In the example of FIG. 1, low-power display 118 shows the time. However, low-power display could be used to show other kinds of information. Some examples of information that could be shown on low-power display 118 include a user's name (shown on low-power display 118 of the instance of device 100 that is shown in FIG. 2), or a graphic (shown on low-power display 118 of the instance of device 100 that is shown in FIG. 3). In one example, display 118 is used to customize the surface of device 100 by showing some text or graphics that are specific to the user in the sense that the text or graphics are selected by the user, specified by the user, or are derived from some state information that the device may maintain about the user. ("Graphics" may include either images that were captured by camera, or images that were drawn or created in some manner.) Thus, the user's name (FIG. 2) is one example of user-specific information. A graphic that is specified or selected by the user (FIG. 3) is another example of information that is specific to the user. The graphic could be animated—e.g., a user might choose to have low-power display 118 show the motion of celestial bodies in the night sky. The animation could be carried out by device 100's processor, or by a separate low-power processor, as described below in connection with FIG. 4. (Such an animation is an example of a user-specific graphic in the sense that a user has chosen the animation to customize the appearance of device 100.) As a further example, there might be some state information relating to the user, such as the user's search history, purchase history, call history, location, etc. Such information could be used to generate some information that is specific to the user, which could be shown on low-power display 118. For example, low-power display 118 could show the Earth as a globe, and could indicate the user's current position on the globe. As another example, low-power display 118 could show an image of the user's last purchase. These are all examples of user-specific information, which could be shown on a low-power display 118 as a way of giving device 100 a customized or personal appearance.

It is noted that low-power display could be used for any purpose, regardless of whether such purpose is to customize and/or personalize the appearance of device 100—e.g., low-power display 118 could be used as an electronic book reader, since some types of low-power displays (e.g., e-ink displays) may be easier on the eyes for long periods of reading than are high-power backlit displays.

Figure 4:
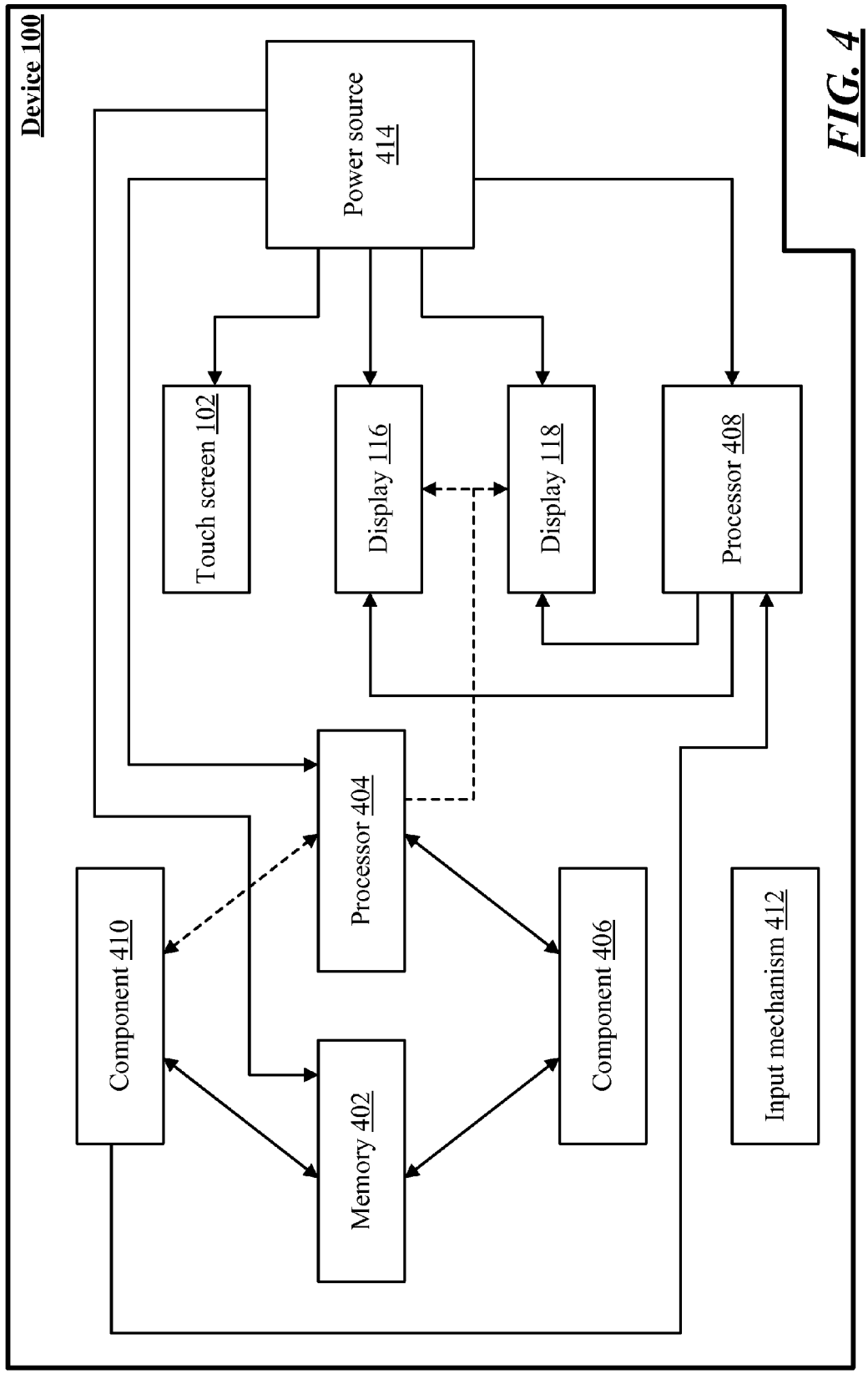
FIG. 4 is a block diagram of some example details of the device shown in FIG. 1.

FIG. 4 shows some example details of device 100. Device 100 may comprise memory 402 and processor 404. Memory 402 may be a volatile or non-volatile random access memory (RAM), a flash memory, a hard disk, a removable magnetic or optical disk, etc. Processor 404 may be a microprocessor, such as the kind of microprocessor that is typically used in computers, mobile phones, or other devices. Device 100 may have various executable components that are stored in memory 402 and that execute on processor 404. For example component 406 may be application and/or systems software that is stored in memory 402 and that executes on processor 404.

Device 100, as described above, may have a touch screen 102 and low-power displays 116 and 118. In one example, touch screen 102 and low-power displays 116 and 118 may be driven by distinct processors. Using separate processors to drive the high-power and low-power displays allows the low-power displays to operate while device 100 is in sleep mode. The device might have a sleep mode and an active mode; in one example, one of the processors operates only when the device is in active mode, but the other processor (e.g., the one that drives the low-power display) operates regardless of whether the device is in sleep mode or active mode. Some low-power displays (e.g., e-ink displays) can display information without the continuous application of power. However, by having a separate processor drive the low-power displays, an application can be used to change the information that is being shown by the low-power displays even when device 100 is in sleep mode—e.g., the low-power display could show an animation, a clock that changes in real time, etc., even when device 100 is in sleep mode.

Thus, in the example of FIG. 4, processor 408 is used to drive displays 116 and 118. Processor 408 may, for example, be a low-power processor that consumes less power than processor 404. Component 410 may be an application (or other software) that is stored in memory 402 and that executes on processor 408. For example, component 410 may keep track of the date, the time, device 100's location, the weather, the current amount of charge left in the battery, etc., and may update this information continually on low-power displays 116 and 118. Since component 410 executes on processor 408, component 410 is able to update this information on displays 116 and 118 even when device 100 is in sleep mode (in the case where the device is considered to be in sleep mode when processor 404 is off). Of course, displays 116 and 118 could also be driven by processor 404 (as indicated by the dashed lines), so that processor 404 can display information on touch screen 102 and on low-power displays 116 and 118 while processor 404 is executing normal application and/or system software. However, the use of a separate processor 408 allows information to be displayed and/or updated on low-power displays 116 and 118 even when device 100 is in sleep mode.

Since low-power displays may be used to display user-specific information such as skins, tattoos, etc., device 100 may employ an input mechanism 412 to receive the user's choice of what is to be displayed. Input mechanism 412 may be touch screen 102, or may be some other type of mechanism (e.g., a keyboard, a microphone, a writing tablet, network interface, etc.). In one example, the user indicates what is to be shown by choosing text or graphics from a menu—e.g., the user could be given a set of, say, twenty different skins, and might choose one of the skins. In another example, the user specifies what is to be shown by providing the text and/or graphics as input—e.g., the user could specify graphics by drawing a new graphic with a drawing program, or could specify text by inputting the text directly, or by inputting a script that generates text. Input mechanism 412 may be used to receive this choice and/or specification of what is to be shown on low-power displays 116 and 118. It is also noted that—while a low-power display might not be able to act as an input device directly—one could still interact with a low-power display. For example, with reference to FIG. 1, the functions assigned to physical buttons 106 and 108 could be identified on a low-power display—e.g., if there is a low-power display next to the buttons, the low-power display could identify the buttons as affect the audio volume, screen brightness, or some other function. Or, as another example, buttons might be displayed on the low-power display, and a user could interact with those buttons by touching a full-power touch screen on the reverse side of the device, directly opposite the "buttons" shown on the low-power display.

As noted above, low-power displays may be driven by one of device 100's processors even when the device is in sleep mode, and may display information even when high-power displays on the device are off. Thus, device 100 may employ a power source 414 (e.g., AC/DC power converter, battery, solar panel, etc.) that can provide power separately to the various components on device 100. Power source 414 may be connected to touch screen 102, displays 116 and 118, processors 404 and 408, memory 402, or any other component that draws power. Power source 414 may apply power to any one or more of these components, while denying or limiting power to the other components. Thus, device 100 can conserve power by removing power from touch screen 102, while allowing low-power displays 116 and 118 to be sufficiently powered to display information (or to change the information that they are displaying). Additionally, device 100 can use power source 414 to power one of processors 404 and 408, while keeping the other processor unpowered. When device 100 is in sleep mode, power source 414 may apply power to memory 402 (and, possibly processor 408), while keeping processor 404 unpowered. In this way, low-power displays can be used on device 100, and can receive sufficient power to perform their functions, even while device 100 otherwise conserves power.

Figure 5:
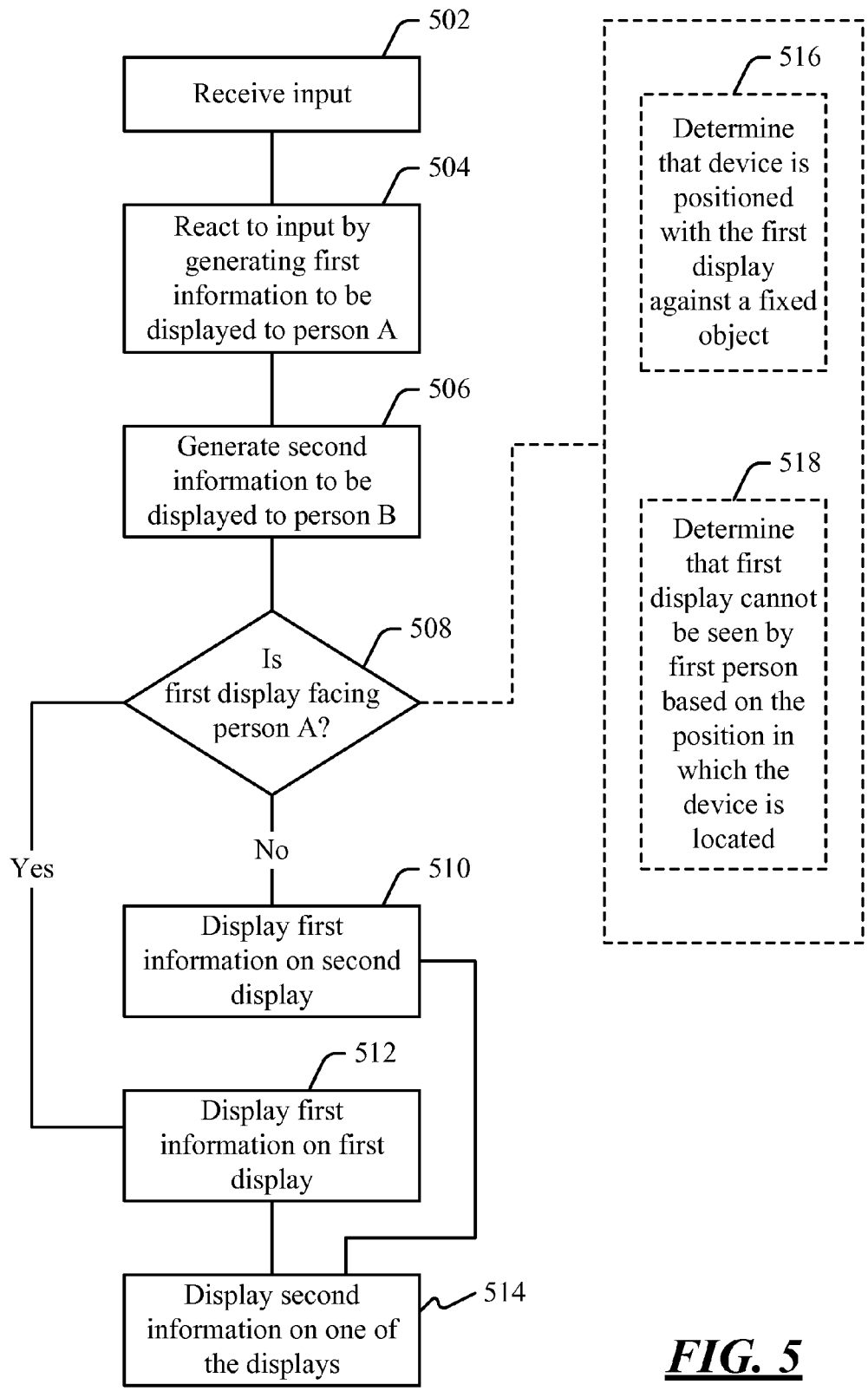
FIG. 5 is a flow diagram of an example process in which a device with a low-power display may be used.

FIG. 5 shows an example process in which a device with a low-power display may be used. Before turning to a description of FIG. 5, it is noted that the flow diagram of FIG. 5 is described, by way of example, with reference to components shown in FIGS. 1-4, although the process of FIG. 5 may be carried out in any system and is not limited to the scenarios shown in FIGS. 1-4. Additionally, the flow diagram in FIG. 5 shows an example in which stages of a process are carried out in a particular order, as indicated by the lines connecting the blocks, but the various stages shown in FIG. 5 can be performed in any order, or in any combination or sub-combination.

At 502, input is received by a device. The input may be received through any mechanism—e.g., a touch screen, a keyboard, a lens, a microphone, etc. At 504, the device reacts to the input by generating some information (referred to herein as "first" information) to be displayed to a person. (FIG. 5 refers to two people; the two people in FIG. 5 will be referred to as "person A" and "person B.") The nature of the reaction that occurs at 504 may be dependent on the type of data received, and on the type of application that the device is running. For example, if the application is a photo-taking application, then the nature of the input may be an indication that a user wants to take a photo In this case, person A might be a subject of the photo, and the device might react by generating any of the following: a countdown to alert the subject that a picture is about to be taken (e.g., "picture will be taken in 3 . . . 2 . . . 1 . . . "); a view through the lens (e.g., a viewfinder-style image); an indication that the subject has been brought into optical focus; an indication that video is being recorded (e.g., a red dot), or any other type of information. In another example, the application might be a program that instructs the user on how to collect photos of a spatial region (e.g., a room) in order to collect sufficient visual data to build a three-dimensional model of the spatial region. In that example, person A might be the person taking the pictures, and the information to be displayed to person A could be instructions on where to position the camera in order to obtain an adequate supply of images for the program. In another example, the input received by the device might be an indication of a personalized skin or tattoo, and the reaction might be to display that skin or tattoo. The foregoing are some examples of input that could be received, and of a reaction that a device could have to such input. However, the subject matter herein applies to any appropriate example of receiving and reacting to input. At 506, the device may generate additional information ("second" information) to be displayed to a second person ("person B").

A device that performs the actions in FIG. 5 may have plural displays, including a first display and a second display. In keeping with the earlier discussion, the first display might be a high-power display such as a touch screen, and the second display might be a low-power display such as an e-ink display. However, the subject matter herein is not limited to this example. With regard to these two displays, at 508 it may be determined whether the first display is facing person A. If the first display is not facing person A, then the information or content that was generated at 504 (the "first information") may be displayed on the second display (at 510). Otherwise, the first information is displayed on the first display (at 512). Additionally, the second information (the information that was generated at 506) may be displayed on one of the displays (at 514).

Although the subject matter herein is not limited to any particular example, the following is an example of how the foregoing scenario involving two displays, two people, and two pieces of information could proceed. A person could indicate to a device that he wants to take a photo. He could indicate this intent by pressing a button on the device. The pressing of the button is an example of the input that could be received at 502. In this example, person A could be the subject of the photo, and person B could be the user of the device who wants to take the photo. The device could react to the pressing of the button by generating a countdown to be shown to the subject, and generating a view through the lens (e.g., a viewfinder image) to be shown to the device's user. The device may be configured such that the lens is on the surface that has the low-power display, and the touch screen is on a surface located opposite to the lens. Based on the device's knowledge of this physical configuration, the device could determine that the touch screen is not facing the subject (person A), and could thus display the countdown on the low-power display. The device could then display the viewfinder image on one of the device's displays; given the example configuration of such a device (in which the touch screen is on the opposite side of the device form the lens), it would be natural to assume that the user of the device (i.e., the person taking the picture) is on the side of the device where the touch screen is located. Based on this assumption, the viewfinder image may be displayed on the touch screen. The foregoing is a specific example of the general process of FIG. 5, although FIG. 5 applies to other examples and is not limited to photo-taking applications.

As noted above, at 508 a device determines whether a first display is facing a particular person, and then shows certain information either on the first display, or on a different display, depending on whether the first display is facing that person. The following are some specific examples of how that decision could be made. It is noted that the subject matter herein is not limited to these specific examples.

In one example (block 516), it could be determined that the first display is positioned against a fixed object, thereby preventing person A from seeing the first display. For example, person A might be using the device to take pictures of the night sky, and might lay the camera, lens up, against the ground (where the ground is an example of a "fixed object"). If the lens and touch screen are on opposite sides of the device, then it could be determined—based on the fact that the lens is pointing up to the sky—that the touch screen is against the ground and thus is not visible to the user of the device. (The orientation of the camera could be detected, for example, by the use of a gyroscope and/or accelerometer in the device.) In another example (block 518), it may be determined that the first display cannot be seen by a person based on the position in which the device is located. For example, as noted above, an application might issue directions to a person on how to take photos to cover a three-dimensional spatial area, such as a room. The application might direct the person to position the device in a crevice of the room, in such a way that the touch screen is pointing away from that person. Thus, the device might issue instructions, or provide a viewfinder image, on the low-power display based on the determination that the high-power display is not facing that person. These are a few examples of how a device could determine that a particular display is not facing a particular person, although the device could make this determination in any manner or in any context.

It is noted that a device can "determine" that a particular display is not facing a particular person even if that determination is not correct. In the example in which an application is directing a person on how to take pictures of a room, the application might direct a person to position the camera in a crevice of the room and might determine, based on the position of the device, that the person cannot see the touch screen on the device. However, the device might be wrong—i.e., it might be the case that the person really can see the device's touch screen in that position. In this example, the device has made a determination that the person cannot see the touch screen; the fact that the determination turns out to be wrong does not negate the fact that a determination has been made. Moreover, a determination does not have to be made in real-time, and can be made in advance. For example, an application could be designed to presume that the subject of a photo cannot see the touch screen (perhaps because it is known that the device's lens is on the opposite side of the device from the touch screen). Thus, the device might be configured to display a countdown (or other information to be shown to the subject) on a display other than the touch screen without attempting to assess, on a case-by-case basis, whether the subject can see the touch screen. It will be understood that even in such a situation, the device has performed the act of determining that the subject of the photo cannot see the touch screen.

Figure 6:
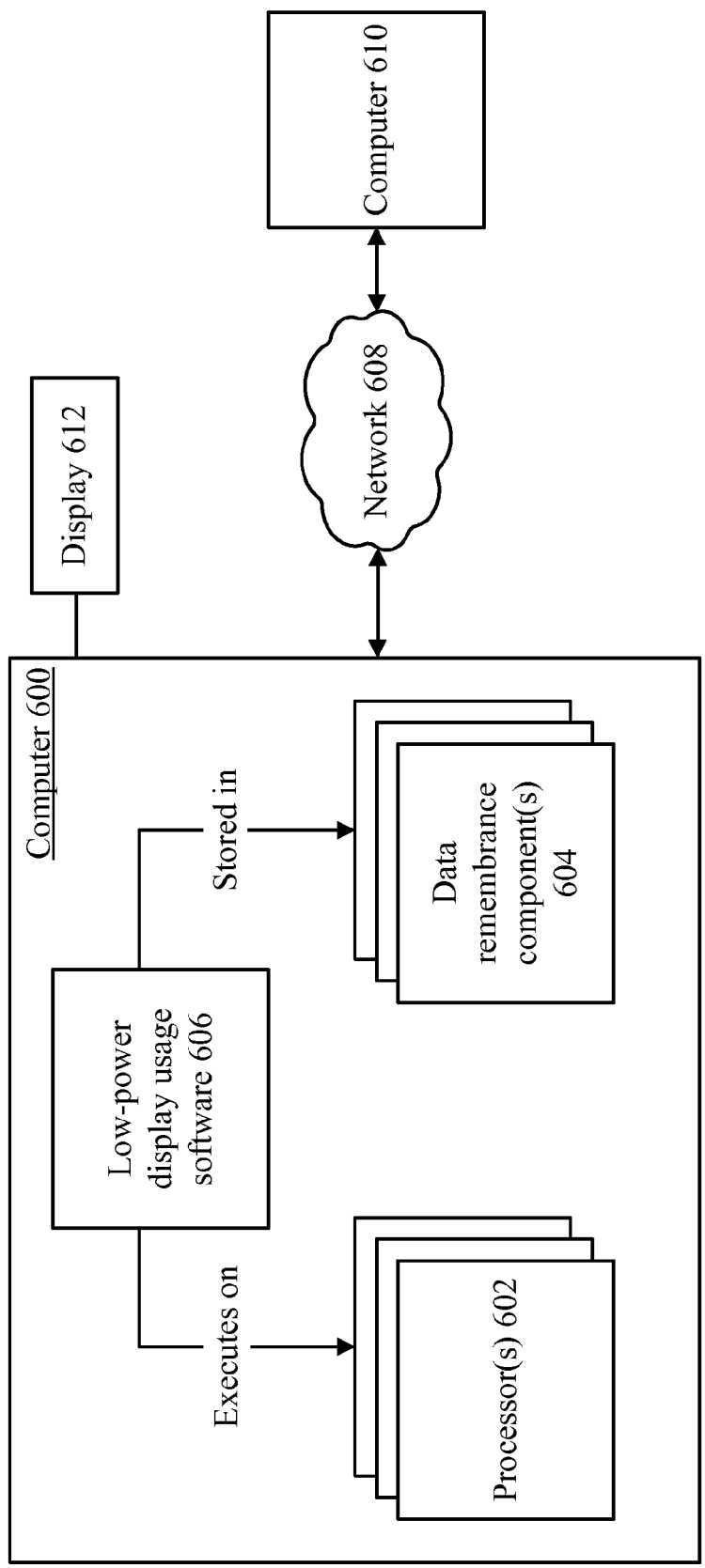
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable (or device-readable) storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is low-power display usage software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

At various points herein, items may be described as being "distinct". In general, two items are "distinct" if they are not the same item, although the two items may be said to be identical to each other. For example, a first processor and a second processor might be described as being distinct. These two processors might be exactly the same model of processor, or they might be different models of processor. However, in this example, the two processors would be "distinct" in the sense that "first processor" and "second processor" are not merely different labels for the same processor; rather, each label refers to a separate item. The term "distinct" can be applied similarly to any type of item.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device comprising:
   a memory;
   a first processor;
   a first display on a first side of the device, the first display utilizing a first display technology that, when displaying information, operates at a first level of power, said first display being turned off while said device is in a sleep mode;
   a second display utilizing a second display technology that differs from the first display technology and that, when displaying information, operates at a second level of power that is lower than said first level of power, said second display being operational both while said device is in said sleep mode and while said device is in an active mode, wherein at least a portion of said second display is on a second side of the device opposite the first side of the device;
   a first component that is stored in said memory and that executes on said first processor, wherein said first component displays, on said second display, while said device is in said sleep mode, text or graphics selected by a user of the device;
   a second component that is stored in said memory and that executes on said first processor, wherein, in response to user input directed only to said first display, said second component simultaneously generates both a first text or graphics displayed on said first display and a second text or graphics displayed on said portion of said second display on said second side, said second text or graphics being either a duplication of said first text or graphics or providing information that is supplemental to that provided by said first text or graphics.

2. The device of claim 1, further comprising:
   a second processor that is distinct from said first processor and that drives said first display;
   wherein said first processor animates or changes said text or graphics selected by the user on said second display.

3. The device of claim 1, wherein said text or graphics selected by the user comprises an indication of said device's location.

4. The device of claim 1, further comprising: a lens that is located on said second side of the device.

5. The device of claim 4, wherein said first text or graphics comprises a view through said lens and said second text or graphics comprises at least one of: the view through said lens, a countdown, an indication of optical focus, or an indication of whether a recording is being made.

6. The device of claim 2, wherein said first processor drives said second display and operates while said device is in said sleep mode.

7. The device of claim 2, wherein said second processor drives both said first display and said second display, said second processor being off while said device is in said sleep mode.

8. The device of claim 1, further comprising a third component that is stored in said memory and that executes on said first processor, wherein said third component displays, on said second display, an identification of a function that is selectable either through touch input on said first display opposite said display of said identification on said second display or through a physical button located on a third side of said device, said third side being adjacent to both said first side and said second side.

9. The device of claim 8, wherein said third component displays, on said second display, said function proximate to said physical button.

10. The device of claim 8, wherein said physical button accesses a first function when said device is oriented such that said first display faces a user of said device and accesses a second function, differing from said first function, when said device is oriented such that said second display faces said user.

11. The device of claim 1, wherein said text or graphics are animated.

12. A computing device comprising:
a processor;
a first side;
a second side opposite said first side;
a first display positioned on said first side and utilizing a first display technology that, when displaying information, operates at a first level of power; and
a second display positioned on said second side and utilizing a second display technology that differs from the first display technology and that, when displaying information, operates at a second level of power that is lower than said first level of power, said second display being operational both while said device is in a sleep mode and while said device is in an active mode;
wherein said second display has generated thereon, while said device is in said sleep mode, text or graphics selected by a user of the device; and
wherein further, while said device is in said active mode, said first display has generated thereon, in response to user input directed only to said first display, a first text or graphics and, simultaneously thereto, and also in response to said user input, said second display has a second text or graphics generated thereon, said second text or graphics being either a duplication of said first text or graphics or providing information that is supplemental to that provided by said first text or graphics.

13. The computing device of claim 12, wherein said text or graphics selected by the user comprises an indication of said device's location.

14. The computing device of claim 12, further comprising a lens that is located on said second side of the computing device.

15. The computing device of claim 14, wherein said first text or graphics comprises a view through said lens and said second text or graphics comprises at least one of: the view through said lens, a countdown, an indication of optical focus, or an indication of whether a recording is being made.

16. The computing device of claim 12, further comprising:
a third side adjacent to both said first side and said second side;
a physical button located on said third side;
wherein said second display has generated thereon, proximate to said physical button, an identification of a function selectable through said physical button.

17. The computing device of claim 16, wherein said physical button accesses a first function when said device is oriented such that said first display faces a user of said device and accesses a second function, differing from said first function, when said device is oriented such that said second display faces said user.

18. A method of utilizing a low power display on a device, the method comprising:
generating, on a second display of said device, while said device is in a sleep mode, text or graphics selected by a user of the device;
generating, on a first display of said device, while said device is in an active mode, a first text or graphics in response to user input directed only to said first display; and
generating, on said second display, while said device is in said active mode, also in response to said user input, a second text or graphics, said second text or graphics being either a duplication of said first text or graphics or providing information that is supplemental to that provided by said first text or graphics;
wherein said first display is positioned on an opposite side of said device from said second display and utilizes a first display technology that, when displaying information, operates at a first level of power, said first display being turned off while said device is in said sleep mode; and
wherein further said second display utilizes a second display technology that differs from the first display technology and that, when displaying information, operates at a second level of power that is lower than said first level of power, said second display being operational both while said device is in said sleep mode and while said device is in said active mode.

19. The method of claim 18, wherein said first text or graphics comprises a view through a lens located on a same side of said device as said second display; and wherein further said second text or graphics comprises at least one of: a view through said lens, a countdown, an indication of optical focus, or an indication of whether a recording is being made.

20. The method of claim 18, further comprising: generating, on said second display, proximate to a physical button located on said device on a third side adjacent both said first display and said second display, an identification of a function selectable through said physical button.

* * * * *